United States Patent
Buckholz et al.

(10) Patent No.: US 10,446,803 B2
(45) Date of Patent: Oct. 15, 2019

(54) LEAD TAB FOR BATTERY TERMINAL

(71) Applicant: Robert Bosch GmbH, Stuttgart (DE)

(72) Inventors: Jeffrey Buckholz, Rochester Hills, MI (US); Nick Karditsas, Lake Orion, MI (US); Adam Bisaro, Orion, MI (US); Robert Schoenherr, Oxford, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 51 days.

(21) Appl. No.: 15/689,489

(22) Filed: Aug. 29, 2017

(65) Prior Publication Data
US 2019/0067671 A1 Feb. 28, 2019

(51) Int. Cl.
| | |
|---|---|
| *H01M 2/30* | (2006.01) |
| *H01M 2/02* | (2006.01) |
| *H01M 2/06* | (2006.01) |
| *H01M 10/0525* | (2010.01) |
| *H01M 2/08* | (2006.01) |
| *H01M 2/20* | (2006.01) |

(52) U.S. Cl.
CPC .......... *H01M 2/021* (2013.01); *H01M 2/024* (2013.01); *H01M 2/0275* (2013.01); *H01M 2/0277* (2013.01); *H01M 2/0285* (2013.01); *H01M 2/0287* (2013.01); *H01M 2/06* (2013.01); *H01M 2/08* (2013.01); *H01M 2/206* (2013.01); *H01M 2/30* (2013.01); *H01M 10/0525* (2013.01); *H01M 2002/0297* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 8,936,866 B2 | 1/2015 | Oh et al. | |
| 9,142,840 B2 | 9/2015 | Rich et al. | |
| 2011/0129726 A1 | 6/2011 | Tsukamoto et al. | |
| 2016/0099447 A1 | 4/2016 | Takada | |
| 2017/0069914 A1* | 3/2017 | Lancaster | H01M 4/685 |

FOREIGN PATENT DOCUMENTS

| | | |
|---|---|---|
| JP | 2000285903 | 10/2000 |
| JP | 2001057203 | 2/2001 |
| JP | 2003242961 | 8/2003 |

OTHER PUBLICATIONS

PCT International Search Report for PCT/EP2018/071231.

* cited by examiner

*Primary Examiner* — Ula C Ruddock
*Assistant Examiner* — Tony S Chuo
(74) *Attorney, Agent, or Firm* — Kelly McGlashen; Maginot Moore & Beck LLP

(57) ABSTRACT

An electrochemical pouch cell includes a stacked or rolled arrangement of electrode plates disposed in a cell housing, and a lead tab that protrudes through the cell housing. The lead tab forms an electrical connection with the electrode plates within the cell and permits transfer of current out of the cell via an opening in a seal joint of the pouch cell housing. The lead tab has a configuration that improves reliability of the seal between the lead tab and the opening.

20 Claims, 4 Drawing Sheets

LEAD TAB FOR BATTERY TERMINAL

BACKGROUND

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in two or three dimensional arrays and are electrically connected in series or in parallel. Likewise, the battery modules within a battery pack are electrically connected in series or in parallel.

Different cell types have emerged in order to deal with the space requirements of a very wide variety of installation situations, and the most common types used in automobiles are cylindrical cells, prismatic cells, and pouch cells. Regardless of cell type, each cell may include a cell housing and an electrode assembly disposed in the cell housing. The electrode assembly includes a series of stacked or rolled positive electrode plates that alternate with negative electrode plates and are separated by an intermediate separator plates. Each cell may also include a first current collector that is electrically connected to the positive electrode plates and joins the positive electrode plates to a positive cell terminal disposed outside the cell housing, and a second current collector that is electrically connected to the negative electrode plates and joins the negative electrode plates to a negative cell terminal disposed outside the cell housing.

In a pouch cell, the first and second current collectors typically each include a lead tab that passes out of the pouch between two stacked layers of pouch fabric and along a weld line that joins the layers of pouch fabric together and forms a sealed joint. The lead tab is used to pass current from inside the pouch cell housing to the outside where it can be electrically connected to an external structure such as a terminal. A sealing tape having specialized material properties is applied to each side of the lead tab at the sealed joint where the lead tab passes between the layers and out of the pouch. The sealing tape is hot melted to the inside layer of the metal foil laminate material used to form the pouch cell housing.

It is advantageous to be able to quickly charge and discharge the electrochemical cell. The rate of charge or discharge is due at least in part to the cross sectional area of the lead tab, where an increased lead tab thickness results in reduced electrical resistance and increased current carrying capacity. However, increased lead tab thickness sometimes results in gaps being formed between the sealing tape and the lead tab at the ends of the lead tab. Thus, it is desirable to provide a lead tab that has sufficient thickness to meet current carrying capacity requirements while forming a reliable seal with the pouch cell opening via the sealing tape.

SUMMARY

In some aspects, an electrochemical cell includes a cell housing formed of a flexible sheet. The cell housing has a first housing portion, and a second housing portion that is joined to the first housing portion along a sealed joint to form a pouch. The electrochemical cell includes an electrode assembly disposed in the cell housing, the electrode assembly including positive electrode portions alternating with negative electrode portions. The positive electrode portions and the negative electrode portions are separated by at least one separator and stacked along a stack axis. The electrochemical cell also includes a lead tab that extends through the sealed joint. The lead tab includes a first end that is disposed inside the cell housing and is electrically connected to one of the positive electrode portions and the negative electrode portions. The lead tab includes a second end that is opposed to the first end and disposed outside the cell housing. The lead tab includes a longitudinal axis that extends between the first end and the second end, and a first cross section that is transverse to the longitudinal axis. The first cross section includes a width dimension that is transverse to the longitudinal axis and a thickness dimension that is transverse to both the longitudinal axis and the width dimension. The first cross section has a first thickness in a center of the width dimension, and a second thickness at opposed ends of the width dimension. The first thickness is larger than the second thickness, and the transition between the first thickness and the second thickness is a concavity having a first radius.

The electrochemical cell may include one or more of the following features: The first cross section consists of four concavities. The first cross section has symmetry about a first axis and a second axis, where the first axis and the second axis are transverse to the longitudinal axis and each other. The first thickness has a dimension of at least 2 mm. The first radius is in a range of 6 mm to 9 mm. The thickness dimension is parallel to the stack axis. The flexible sheet is a laminate that includes a metal foil disposed between polymer layers. The cell includes a polymer tape that surrounds a circumference of the lead tab at a location corresponding to the seal joint, the polymer tape providing a seal between the lead tab and the first and second housing portions. The polymer tape comprises a first tape portion and a second tape portion, the first tape portion overlying a first surface of the lead tab including a first concavity, a second concavity and a first land between the first and second concavities, and the second tape portion overlying a second surface of the lead tab including a third concavity, a fourth concavity and a second land between the third and fourth concavities.

In some aspects, an electrochemical cell includes a cell housing formed of a flexible sheet. The cell housing has a first housing portion, and a second housing portion that is joined to the first housing portion along a sealed joint to form a pouch. The electrochemical cell includes an electrode assembly that is disposed in the cell housing, the electrode assembly including positive electrode portions alternating with negative electrode portions, and the positive electrode portions and the negative electrode portions are separated by at least one separator and stacked along a stack axis. In addition, the electrochemical cell includes a lead tab that extends through the sealed joint. The lead tab includes a first end that is disposed inside the cell housing and is electrically connected to one of the positive electrode portions and the negative electrode portions, a second end that is opposed to the first end and disposed outside the cell housing, a longitudinal axis that extends between the first end and the second end, and a first cross section that is transverse to the longitudinal axis. The first cross section includes a width dimension that is transverse to the longitudinal axis and a thickness dimension that is transverse to both the longitudinal axis and the width dimension. The first cross section is symmetric about a first transverse axis parallel to the thickness dimension and includes a concavity on each of opposed sides of the first transverse axis, the concavities on each of the opposed sides of the first transverse axis arranged such that a thickness of the first cross section is greater along the first transverse axis than at a location spaced apart from the first transverse axis.

The electrochemical cell may include one or more of the following features: The first cross section has a first thickness in a center of the width dimension, and a second thickness at opposed ends of the width dimension, where the first thickness is larger than the second thickness, and the transition between the first thickness and the second thickness is formed as a concavity having a first radius. The first cross section is symmetric about a second transverse axis that is parallel to the width dimension and includes a concavity on each of opposed sides of the second transverse axis. The first cross section consists of four concavities. The thickness dimension is parallel to the stack axis. The flexible sheet is a laminate that includes a metal foil disposed between polymer layers. The cell includes a polymer tape that surrounds a circumference of the lead tab at a location corresponding to the seal joint, the polymer tape providing a seal between the lead tab and the first and second housing portions. The polymer tape comprises a first tape portion and a second tape portion, the first tape portion overlying a first surface of the lead tab including a first concavity, a second concavity and a first land between the first and second concavities, and the second tape portion overlying a second surface of the lead tab including a third concavity, a fourth concavity and a second land between the third and fourth concavities.

The pouch cell includes an electrode assembly that is sealed within a pouch-type, metal laminated film cell housing along with an electrolyte to form a power generation and storage unit. The electrode assembly may, for example, be a "stacked" electrode assembly that includes a series of stacked positive electrode plates alternating with negative electrode plates and separated by an intermediate separator plates. In addition, the pouch cell includes a lead tab. The lead tab forms an electrical connection with the electrode plates of a given polarity within the cell and permits transfer of current out of the cell via an opening in a seal joint of the pouch cell housing. The lead tab has a configuration that improves reliability of the seal between the lead tab and the opening.

In particular, the lead tab is formed having a cross-sectional area that is sufficiently large to permit a high current capacity, which in turn allows for fast charge and discharge of the cell relative to some conventional lead tabs, as well as supporting low resistance connections (for example, less than 100 micro Ohms) to peripheral devices. Since current pouch cell geometries limit the possibilities for increasing lead tab width, an increase in cross-sectional area is achieved by providing a lead tab having an increased thickness relative to the thickness of some conventional lead tabs. For example, in some embodiments, the lead tabs may have a thickness that is greater, or much greater, than 0.2 mm. To address bonding gaps that may occur between ends of the lead tab and the sealing tape due to the increased thickness of the lead tab, the lead tab has profiled edges. The profiled edges provide the lead tab with a cross-sectional shape that allows use of conventional sealing methods including use of seal tape, and also improves reliability of the seal between the lead tab and the opening.

The lead tab profiled edges result in a cross section that is non-uniform in thickness along width direction. The cross section includes concave portions that provide a transition between a maximum thickness at the center in the width direction and a minimum thickness at the tab ends in the width direction.

DETAILED DESCRIPTION

Figure 1:
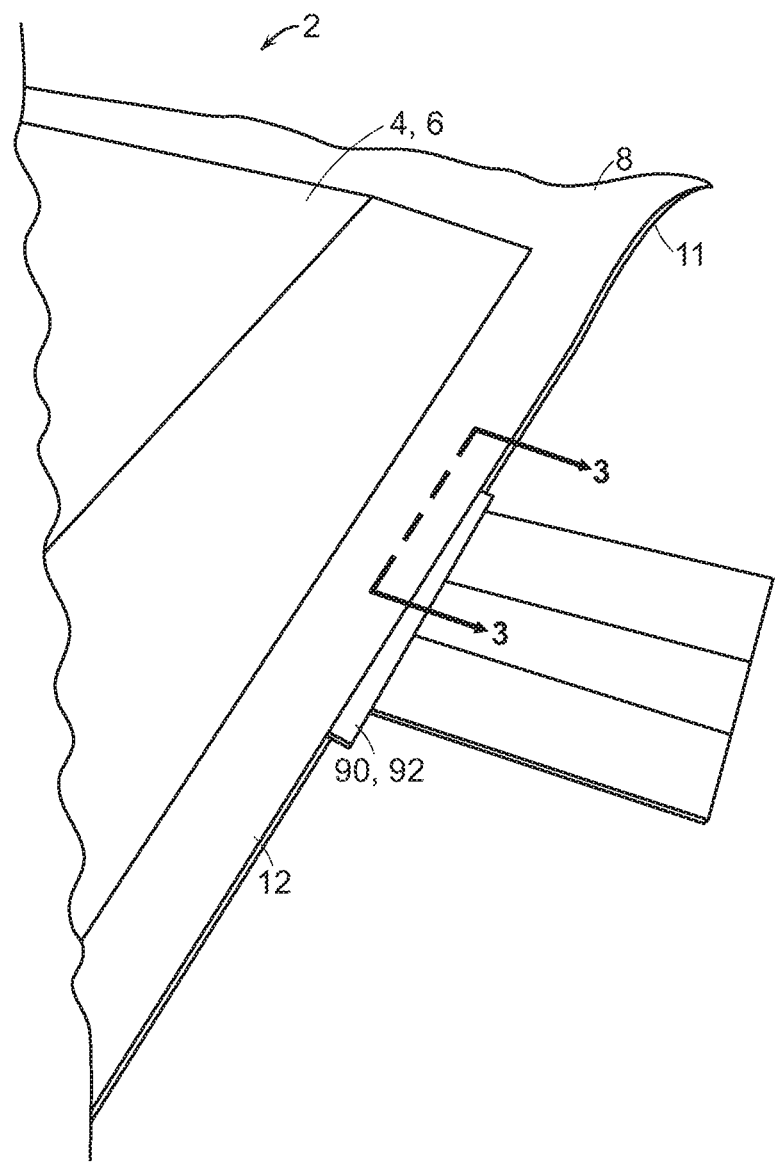
FIG. 1 is a perspective view of a portion of a pouch cell including a lead tab protruding through a seal joint and sealed therein using a seal tape.
Figure 2:
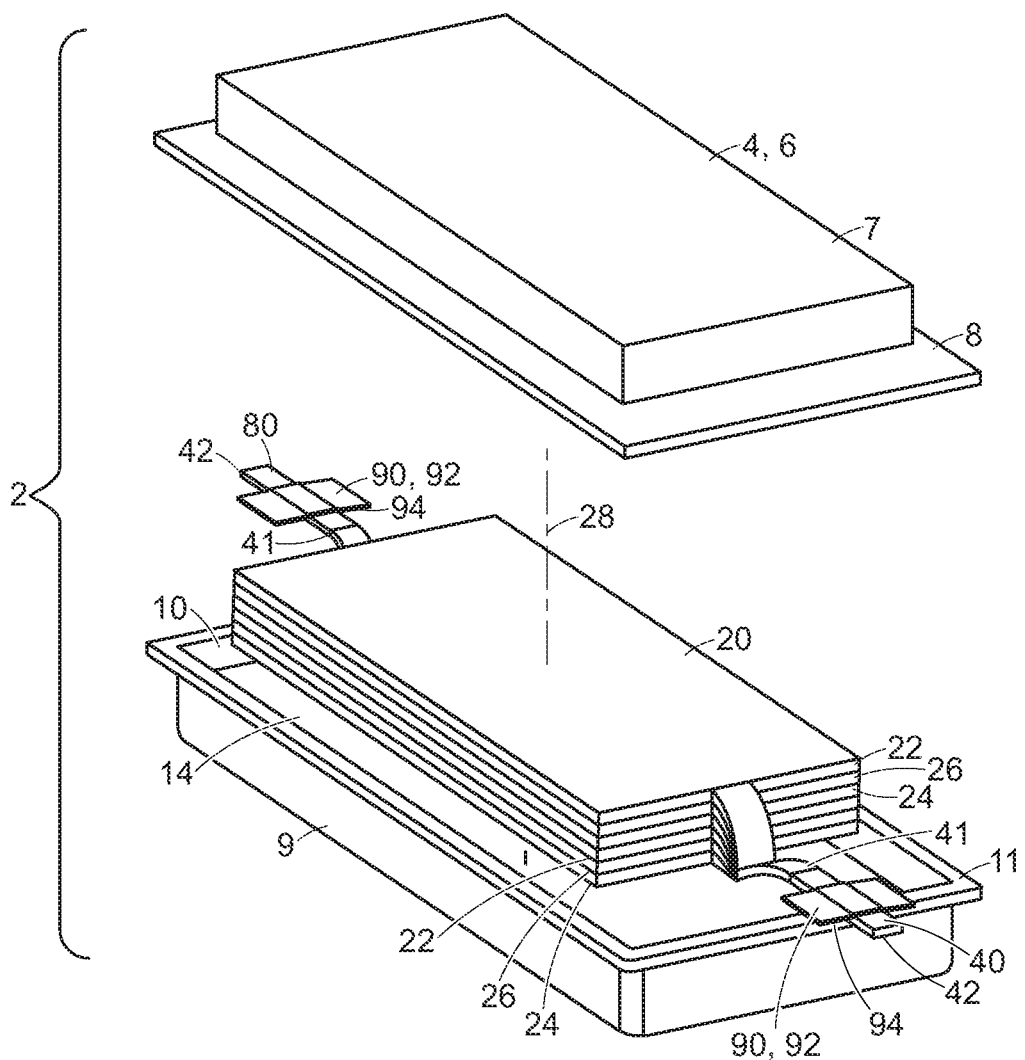
FIG. 2 is an exploded perspective view of the pouch cell of FIG. 1.

Referring to FIGS. 1-4, a lithium-ion pouch cell 2 includes an electrode assembly 20 that is sealed within a cell housing 4 along with an electrolyte to form a power generation and storage unit. In some embodiments. groups of cells 2 may be bundled together and electrically connected to form battery modules (not shown). Likewise, battery modules may be bundled together and electrically connected to form a battery pack (not shown). Lead tabs 40 protrude through the cell housing 4 and form an electrical connection with the electrode plates within the cell 2 and permit transfer of current out of the cell 2. To that end, each lead tab 40 exits the cell housing 4 via an opening 16 in a sealed joint 12 of the pouch cell housing 4. The lead tabs 40 have a configuration that improves the effectiveness and reliability of the seal between the lead tab 40 and the cell housing 4, as discussed in detail below.

The pouch-type cell housing 4 is an assembly of two blanks of a metal laminated polymer film sheet. For example, in the illustrated embodiment, the material used to form the housing 4 is a flexible, three-layer, metal laminated film having a polypropylene layer, an aluminium foil layer, and a polyethylene layer. Each blank is drawn to form the shape of an open-ended box in which the open end is surrounded by a flange. The first blank corresponds to a first housing portion 6 that includes a central first recess 7 surrounded by a first flange 8. The second blank corresponds to a second housing portion 9 including a central second recess 10 surrounded by a second flange 11. The first and second housing portions 6, 9 are assembled together such that the first flange 8 abuts the second flange 11, and such that the first recess 7 and the second recess 10 cooperate to form a rectangular enclosure 14 that defines an interior space that is dimensioned to receive the electrode assembly 20. With the electrode assembly 20 and the electrolyte disposed within the enclosure 14, the first and second flanges 8, 11 are joined, for example via welding. In particular, a continuous sealed joint 12 is formed along the flanges 8, 11. The sealed joint 12 surrounds the enclosure 14.

The electrode assembly 20 is disposed in the enclosure 14 and includes at least one positive electrode 22, at least one negative electrode 24 and a separator 26 that is disposed between each pair of the positive electrode 22 and the negative electrode 24. Each of the positive electrodes 22, the negative electrodes 24 and the separators 26 are thin plates, and each of the positive and negative electrodes 22, 24 have a layered structure to facilitate insertion and/or movement of lithium-ions. For example, the positive electrodes 22 may include a first substrate formed of a first electrically-conductive material such as copper, and a first active material such as a graphite coating that is disposed on one or both sides of the first substrate. In addition, negative electrodes 24 may include a second substrate formed of a second electrically-conductive material such as aluminium, and a second active material such as a lithiated metal oxide coating that is disposed on one or both sides of the second substrate. The substrates used to form the positive and negative electrodes 22, 24 are very thin (e.g., having a thickness on the order of about 0.04 to 0.15 mm) compared to the overall cell height (e.g. having a height in a range of 10 to 40 mm) and thus are illustrated schematically and not to scale in the figures.

The separator 26 is a permeable membrane that functions to keep the positive and negative electrodes 22, 24 apart to prevent electrical short circuits while also allowing passage of ionic charge carriers provided in the electrolyte and that are needed to close the circuit during the passage of current within the cell 2. The separator 26 is formed of an electrically insulating material such as a tri-layer polypropylene-polyethylene-polypropylene membrane.

The positive electrodes 22 and negative electrodes 24 are arranged in a stacked or layered configuration in which a separator 26 is disposed (e.g., sandwiched) between each pair of the positive and negative electrodes 22, 24. A stack axis 28 of the electrode assembly 20 extends through a center of the electrode assembly 20 in a direction parallel to the stacking direction. In the stacked configuration, the positive electrodes 22, the negative electrodes 24 and the separators 26 are stacked along the stack axis 28. In some embodiments, the peripheral edges of each of the plates 22, 24, 26 are aligned in a direction parallel to the direction of the stack axis 28 (shown), while in other embodiments, the peripheral edges of the positive electrodes 22 are offset to one side of the stack axis 28, while the peripheral edges of the negative electrodes 24 are offset to an opposed side of the stack axis 28 (not shown). The particular alignment of the peripheral edges facilitates connection of the electrodes 22, 24 to corresponding lead tabs 40, 80 which in turn provide an electrical connection with the respective terminals (not shown) of the cell 2. Thus, the edge alignment is determined based on requirements of the specific application.

A first lead tab 40 is used to provide an electrical connection with the positive electrodes 22, and a second lead tab 80 is used to provide an electrical connection with the negative electrodes 24. In the illustrated embodiment, the first lead tab 40 protrudes from one side of the enclosure 14, and the second lead tab 80 protrudes from an opposed side of the enclosure 14. However, in other embodiments, the first and second lead tabs 40, 80 protrude from the same side of the enclosure 14. The first and second lead tabs 40, 80 are identical, and so only the first lead tab 40 will be described in detail.

Figure 3:
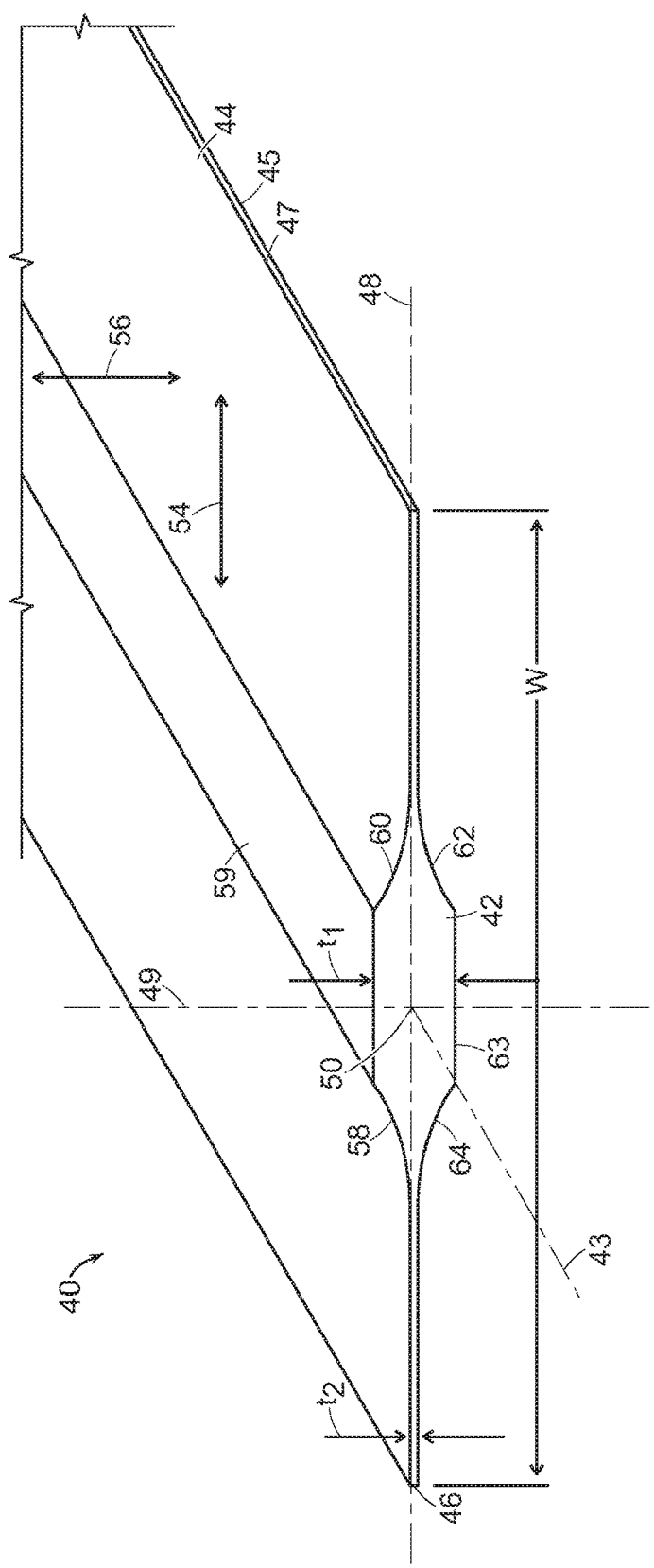
FIG. 3 is a perspective view of a portion of a lead tab isolated from the pouch cell of FIG. 1.
Figure 4:
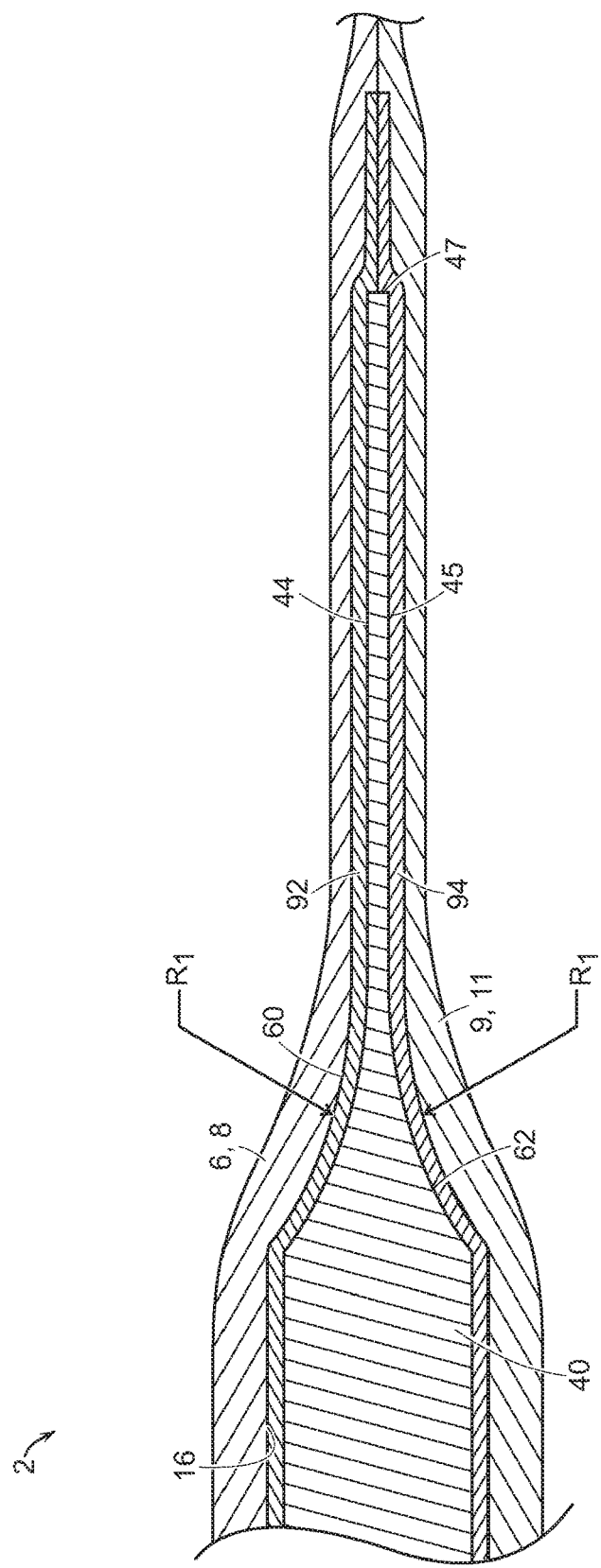
FIG. 4 is a cross sectional view of the pouch cell of FIG. 1 as seen across line 3-3 of FIG. 1.

The first lead tab 40 is an electrically conductive, elongate, thin plate that includes a first end 41 that is disposed inside the housing 4 and is electrically connected to the positive electrodes 22, a second end 42 that is opposed to the first end 41 and is disposed outside the housing 4, and a longitudinal axis 43 that extends between the first end 41 and the second end 42. The first lead tab 40 includes a first surface 44 that faces the first flange 8, and a second surface 45 that faces the second flange 11. The spacing between the first and second surfaces 44, 45 corresponds to a thickness t of the first lead tab 40. The first and second surfaces 44, 45 are joined at one side by a first edge 46 that extends between the first and second ends 41, 42, and are joined at the opposed side by a second edge 47 that extends between the first and second ends 41, 42. The first and second edges 46, 47 extend along a length of the first lead tab 40 in parallel with the lead tab longitudinal axis 43. In addition, the spacing between the first and second edges 46, 47 corresponds to a width w of the first lead tab 40. In FIG. 3, the width direction is illustrated using a double headed arrow having a reference number 54, and the thickness direction is illustrated using a double headed arrow having a reference number 56.

The thickness of the first lead tab 40 is non-uniform along the width direction 54. In particular, a cross section of the lead tab 40 that is transverse to the longitudinal axis 43 has a first thickness t1 in a center portion of the width dimension, and a second thickness t2 at opposed ends of the width dimension (e.g., at the first and second edges 46, 47), where the first thickness t1 is larger than the second thickness t2. The transition between the first thickness t1 and the second thickness t2 has a concave profile, and the concave profile has a first radius R1. The lead tab cross section consists of the four concavities 58, 60, 62, 64. The first concavity 58 is formed in the first surface 44 at a location between the center 50 of the cross section and the first edge 46, and the first concavity 58 extends to the first edge 46. The second concavity 60 is formed in the first surface 44 at a location between the center 50 of the cross section and the second edge 47, and the second concavity 60 extends to the second edge 47. The third concavity 62 is formed in the second surface 45 at a location between the center 50 of the cross section and the second edge 47, and the third concavity extends to the second edge 47. The fourth concavity 64 is formed in the second surface 45 at a location between the center 50 of the cross section and the first edge 46, and the fourth concavity 64 extends to the first edge 46. As a result, the lead tab cross section has symmetry about a first axis 49 parallel to the thickness direction 56 and a second axis 48 parallel to the width direction 54, where the first axis 49 and the second axis 48 pass through the center 50 of the cross section, and are transverse to the longitudinal axis 43 and to each other.

In the illustrated embodiment, the concavities 58, 60, 62, 64 are formed at a location that is closer to the center 50 of the cross section than the corresponding first or second edge 46, 47. As a result, the portion of the cross section that has the first thickness t1 has a smaller width dimension than does the portion of the cross section that has the second thickness t2.

The first thickness t1, the second thickness t2, and the first radius R1 are determined based on the requirements of the application. For example, in some embodiments, the first thickness t1 has a dimension of at least 1 mm, 2 mm, or 3 mm, the second thickness has a dimension of 0.2 mm, and the first radius R1 has a dimension in a range of 6 to 9 mm.

In use, the lead tab 40 extends through an opening 16 in the sealed joint 12. The opening 16 is provided between a portion of the flange 8 of the first housing portion 6 and a facing portion of the flange 11 of the second housing portion 9. A polymer seal tape 90 surrounds a circumference of each lead tab 40, 80 at a location corresponding to the opening 16. The seal tape 90 provides a seal between the lead tab 40 and the facing flange 8, 11. The seal tape 90 is required to have very specific material properties. For example, the seal tape 90 is required to remain solid, tacky and pliable in all conditions except when localized heat is applied as occurs during the pouch fabric welding operation. When localized heat is applied, the seal tape 90 is required to melt, flow into open gaps between materials, and bond to both the pouch material and the respective lead tabs 40.

The seal tape 90 includes a first tape portion 92 and a second tape portion 94. The first tape portion 92 overlies the first surface 44 of the lead tab 40 including the first concavity 58, the second concavity 60 and the first land 59 between the first and second concavities 58, 60. The first tape portion 92 is disposed between the lead tab first surface 44 and the first housing portion flange 8, and has sufficient length to extend outward beyond the respective first and second edges 46, 47 of the lead tab 40. In addition, the second tape portion 94 overlies the second surface 45 of the lead tab 40 including the third concavity 62, the fourth concavity 64 and the second land 63 between the third and fourth concavities 62, 64. The second tape portion 94 is disposed between the lead tab second surface 45 and the second housing portion flange 11, and has sufficient length to extend outward beyond the respective first and second edges 46, 47 of the lead tab and contact the first tape portion 92. As a result, the seal tape 90, including the first and second tape portions 92, 94, surrounds a circumference of the lead tab 40 at a location corresponding to the seal joint 12. Since the lead tab 40 has the thickness t2 at the first and second edges 46, 47, and the thickness 52 is relatively small for example 0.2 mm or less, the first and second tape portions 92, 94 join to each other and the lead tab first and second edges 46, 47 in such a way that a hermetic seal is formed between the lead tab 40, 80 and the opening 16 in the cell housing 4.

Although the electrode assembly 20 is described herein as being a "stacked" electrode assembly that includes a series of stacked plates 61, 62, the electrode assembly 20 is not limited to this configuration. For example, in some embodiments, the electrode assembly 20 may include a rolled electrode assembly (e.g., a jelly roll assembly), a folded electrode assembly (i.e., a Z-fold assembly), or other suitable electrode arrangement.

In the illustrated embodiment, the pouch-type cell housing 4 is an assembly of two blanks of a metal laminated polymer film sheet, where each blank is drawn to form the shape of an open-ended box. However, the pouch-type cell housing is not limited to this construction. For example, in some embodiments, the pouch-type cell housing may be formed of a sheet of a metal laminated polymer film that is folded to form a recess that receives the electrode assembly, and folded and sealed to form a closed pouch.

Although the cell 2 has a low profile, rectangular-shaped cell housing 4, the cell housing 4 is not limited to this shape. For example, the cell housing 4 may be cube shaped, or may have other polygonal shapes that permit close packing such as an eight surface structure having hexagonally arranged sides (not shown).

Moreover, the cell 2 is not limited to being a lithium-ion battery. For example, the cell 2 may be an aluminum-ion, alkaline, nickel-cadmium, nickel metal hydride, or other type of cell.

Selective illustrative embodiments of the battery system including the cell are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery system and battery cell have been described above, the battery system and/or battery cell are not limited to the working examples described above, but various design alterations may be carried out without departing from the devices as set forth in the claims.

What is claimed is:

1. An electrochemical cell comprising,
    a cell housing formed of a flexible sheet, the cell housing having a first housing portion, and a second housing portion that is joined to the first housing portion along a sealed joint to form a pouch,
    an electrode assembly disposed in the cell housing, the electrode assembly including positive electrode portions alternating with negative electrode portions, the positive electrode portions and the negative electrode portions being separated by at least one separator and stacked along a stack axis, and
    a lead tab that extends through the sealed joint, the lead tab including
        a first end that is disposed inside the cell housing and is electrically connected to one of the positive electrode portions and the negative electrode portions,
        a second end that is opposed to the first end and disposed outside the cell housing,
        a longitudinal axis that extends between the first end and the second end, and
        a first cross section that is transverse to the longitudinal axis, the first cross section including a width dimension that is transverse to the longitudinal axis and a thickness dimension that is transverse to both the longitudinal axis and the width dimension, wherein
    the first cross section has a first thickness in a center of the width dimension, and a second thickness at opposed ends of the width dimension, where the first thickness is larger than the second thickness, and the transition between the first thickness and the second thickness is a concavity having a first radius.

2. The electrochemical cell of claim 1, wherein the first cross section consists of four concavities.

3. The electrochemical cell of claim 1, wherein the first cross section has symmetry about a first axis and a second axis, where the first axis and the second axis are transverse to the longitudinal axis and each other.

4. The electrochemical cell of claim 1, wherein the first thickness has a dimension of at least 2 mm.

5. The electrochemical cell of claim 1, wherein the first radius is in a range of 6 mm to 9 mm.

6. The electrochemical cell of claim 1, wherein the thickness dimension is parallel to the stack axis.

7. The electrochemical cell of claim 1, wherein the flexible sheet is a laminate that includes a metal foil disposed between polymer layers.

8. The electrochemical cell of claim 1, comprising a polymer tape, that surrounds a circumference of the lead tab at a location corresponding to the seal joint, the polymer tape providing a seal between the lead tab and the first and second housing portions.

9. The electrochemical cell of claim 8, wherein the polymer tape comprises a first tape portion and a second tape portion, the first tape portion overlying a first surface of the lead tab including a first concavity, a second concavity and a first land between the first and second concavities, and the second tape portion overlying a second surface of the lead tab including a third concavity, a fourth concavity and a second land between the third and fourth concavities.

10. An electrochemical cell comprising,
    a cell housing formed of a flexible sheet, the cell housing having a first housing portion, and a second housing portion that is joined to the first housing portion along a sealed joint to form a pouch,
    an electrode assembly disposed in the cell housing, the electrode assembly including positive electrode portions alternating with negative electrode portions, the positive electrode portions and the negative electrode portions being separated by at least one separator and stacked along a stack axis, and a lead tab that extends through the sealed joint, the lead tab including
   a first end that is disposed inside the cell housing and is electrically connected to one of the positive electrode portions and the negative electrode portions,
   a second end that is opposed to the first end and disposed outside the cell housing,
   a longitudinal axis that extends between the first end and the second end, and
   a first cross section that is transverse to the longitudinal axis, the first cross section including a width dimension that is transverse to the longitudinal axis and a thickness dimension that is transverse to both the longitudinal axis and the width dimension, wherein
the first cross section is symmetric about a first transverse axis parallel to the thickness dimension and includes a concavity on each of opposed sides of the first transverse axis, the concavities on each of the opposed sides of the first transverse axis arranged such that a thickness of the first cross section is greater along the first transverse axis than at a location spaced apart from the first transverse axis.

11. The electrochemical cell of claim 10, wherein the first cross section has a first thickness in a center of the width dimension, and a second thickness at opposed ends of the width dimension, where the first thickness is larger than the second thickness, and the transition between the first thickness and the second thickness is formed as a concavity having a first radius.

12. The electrochemical cell of claim 10, wherein the first cross section is symmetric about a second transverse axis that is parallel to the width dimension and includes a concavity on each of opposed sides of the second transverse axis.

13. The electrochemical cell of claim 10, wherein the first cross section consists of four concavities.

14. The electrochemical cell of claim 10, wherein the thickness dimension is parallel to the stack axis.

15. The electrochemical cell of claim 10, wherein the flexible sheet is a laminate that includes a metal foil disposed between polymer layers.

16. The electrochemical cell of claim 10, comprising a polymer tape that surrounds a circumference of the lead tab at a location corresponding to the seal joint, the polymer tape providing a seal between the lead tab and the first and second housing portions.

17. The electrochemical cell of claim 16, wherein the polymer tape comprises a first tape portion and a second tape portion, the first tape portion overlying a first surface of the lead tab including a first concavity, a second concavity and a first land between the first and second concavities, and the second tape portion overlying a second surface of the lead tab including a third concavity, a fourth concavity and a second land between the third and fourth concavities.

18. The electrochemical cell of claim 1, wherein the concavity is located closer to the center of the width dimension than to the opposed ends of the width dimension.

19. The electrochemical cell of claim 10, wherein the concavities on each of the opposed sides of the first transverse axis are located closer to a center of the width dimension than to opposed ends of the width dimension.

20. An electrochemical cell comprising,
a cell housing formed of a flexible sheet, the cell housing having a first housing portion, and a second housing portion that is joined to the first housing portion along a sealed joint to form a pouch,
an electrode assembly disposed in the cell housing, the electrode assembly including positive electrode portions alternating with negative electrode portions, the positive electrode portions and the negative electrode portions being separated by at least one separator and stacked along a stack axis, and
a lead tab that extends through the sealed joint, the lead tab including
   a first end that is disposed inside the cell housing and is electrically connected to one of the positive electrode portions and the negative electrode portions,
   a second end that is opposed to the first end and disposed outside the cell housing,
   a longitudinal axis that extends between the first end and the second end, and
   a first cross section that is transverse to the longitudinal axis, the first cross section including a width dimension that is transverse to the longitudinal axis and a thickness dimension that is transverse to both the longitudinal axis and the width dimension, wherein
the first cross section has a first thickness in a center of the width dimension, and a second thickness at opposed ends of the width dimension,
the first thickness is larger than the second thickness,
the transition between the first thickness and the second thickness is curved, and
the transition is located closer to the center of the width dimension than to the opposed ends of the width dimension.

\* \* \* \* \*